United States Patent [19]

Hansen

[11] Patent Number: 4,964,387
[45] Date of Patent: Oct. 23, 1990

[54] DETONATION CONTROL SYSTEM FOR A MARINE ENGINE

[75] Inventor: Steven K. Hansen, Fond du Lac, Wis.

[73] Assignee: Brunswick Corporation, Skokie, Ill.

[21] Appl. No.: 405,687

[22] Filed: Sep. 11, 1989

[51] Int. Cl.⁵ ............................ F02D 41/04; F02P 5/15
[52] U.S. Cl. ..................................... 123/425; 123/435
[58] Field of Search .................... 123/425, 435, 494; 73/35

[56] References Cited

U.S. PATENT DOCUMENTS

| | | | |
|---|---|---|---|
| 4,243,009 | 1/1981 | Staerzl | 123/435 |
| 4,667,637 | 5/1987 | Staerzl | 123/435 |
| 4,711,219 | 12/1987 | Staerzl | 123/494 |
| 4,761,992 | 8/1988 | Staerzl | 73/35 |
| 4,777,913 | 10/1988 | Staerzl et al. | 123/73 A |

Primary Examiner—Tony M. Argenbright
Attorney, Agent, or Firm—Andrus, Sceales, Starke & Sawall

[57] ABSTRACT

A detonation control system for a fuel injected, spark ignition two-cycle engine utilizes a linear series of engine knock signals and a programmable microprocessor to provide a non-linear series of stepped increases in the fuel injection pulse width to the engine effective to substantially reduce or eliminate engine knock. If desired or necessary, the system may also be utilized to provide a non-linear series of stepped increases in spark ignition retard to further reduce or eliminate engine knock. The non-linear stepped increases in the control parameters have been found to effectively control detonation without adversely affecting engine performance and efficiency.

6 Claims, 2 Drawing Sheets

| KNOCK LEVEL | KNOCK VOLTAGE | FUEL PULSE WIDTH PERCENT CHANGE (FPW Δ%) | DEGREES TIMING CHANGE (DTC) |
|---|---|---|---|
| HI | 4.0 | 15.0 | -8 |
| MID | 3.0 | 11.6 | -6 |
| LOW | 2.0 | 6.6 | -3 |
| THRESHOLD | 1.0 | 0.0 | 0 |

| KNOCK LEVEL | KNOCK VOLTAGE | FUEL PULSE WIDTH PERCENT CHANGE (FPW Δ%) | DEGREES TIMING CHANGE (DTC) |
|---|---|---|---|
| HI | 4.0 | 15.0 | -8 |
| MID | 3.0 | 11.6 | -6 |
| LOW | 2.0 | 6.6 | -3 |
| THRESHOLD | 1.0 | 0.0 | 0 |

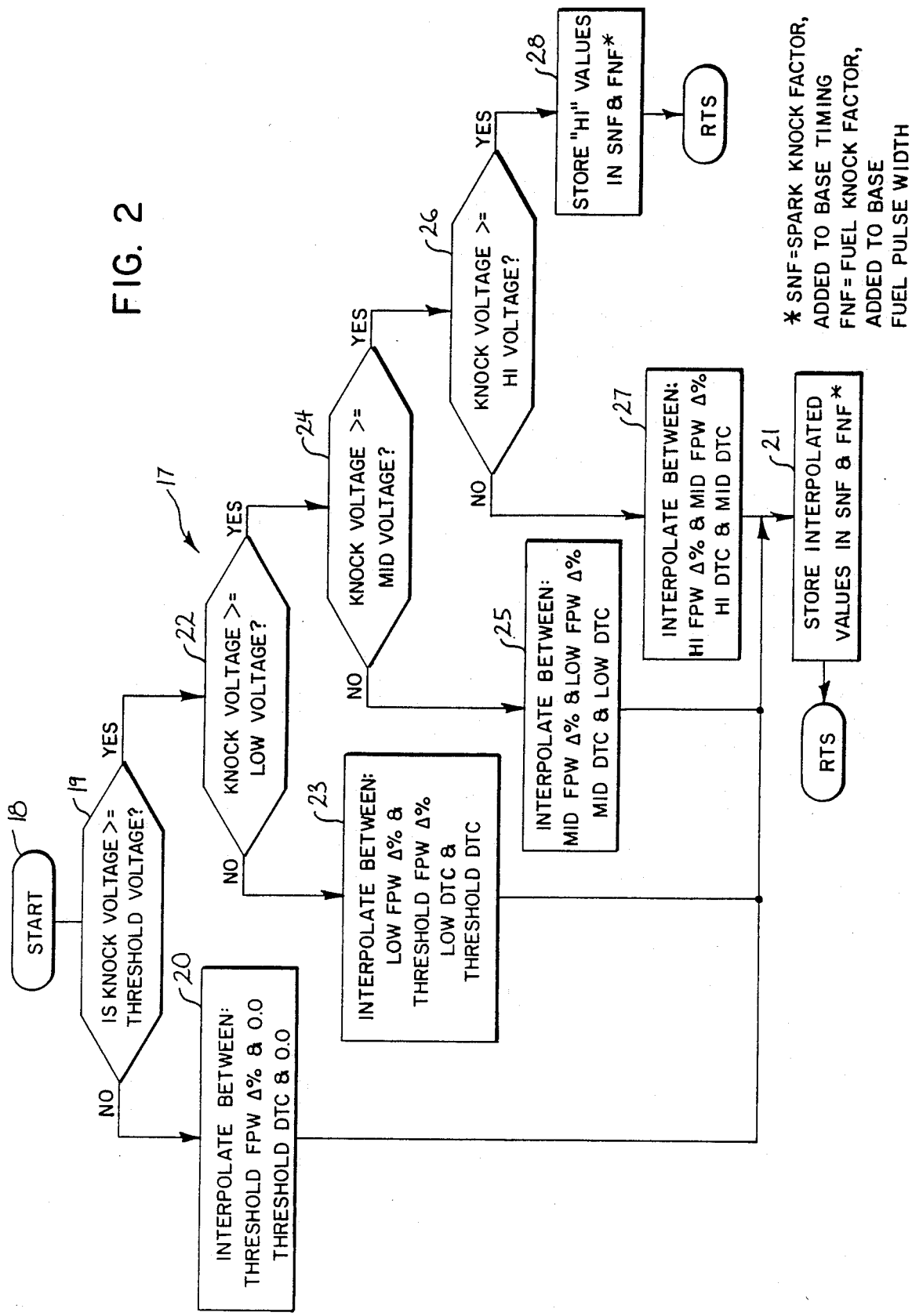

DETONATION CONTROL SYSTEM FOR A MARINE ENGINE

BACKGROUND OF THE INVENTION

The present invention pertains to a system for eliminating detonation or knock in an internal combustion engine and, more particularly, to a detonation control system for a two cycle engine utilizing microprocessor control for fuel injection and spark ignition timing.

Microprocessor-based engine control is well known in the automotive industry. Microprocessor control lends itself extremely well to the control of fuel injection and spark ignition in modern four-cycle automotive engines. Similarly, microprocessor engine control strategies may be applied to control fuel injection and spark ignition in two-cycle engines, particularly larger engines commonly used in marine applications. However, as is well known in the art, the construction and operation of a two-cycle engine varies greatly from that of a four-cycle automotive engine and, therefore, microprocessor control program strategies likewise vary considerably.

Thus, a two-cycle engine requires substantially different spark timing and fuel ignition strategies than a four-cycle engine. Also, variations in air and engine temperatures and in engine speed and other operating parameters require substantially different ignition and fuel strategies in a two-cycle engine as compared to a four-cycle engine.

The phenomenon of detonation, also referred to as engine knock, is common to both four-cycle and two-cycle engines. The prevention of detonation is primarily a function of engine design and construction, however, detonation may still occur in a properly designed engine. Detonation or engine knock is caused by premature self-ignition of the air fuel mixture which creates a pressure wave that interferes with the pressure wave caused by subsequent spark ignition of the fuel. Pre-ignition and knocking is often traceable directly to high engine temperatures. Detonation may become so severe or extend over a long enough period of time as to cause damage to the engine components.

It is known that improperly advanced spark timing may cause or aggravate detonation and that fuel mixture which is too lean may also promote detonation in an engine which is running somewhat too hot or is otherwise susceptible to occurrence of detonation. Thus, it is known that adjustments in the spark timing and in the fuel/air ratio can be used to correct a detonation condition.

U.S. Pat. No. 4,243,009 discloses a system for reducing engine knock in a two-cycle engine by enriching the air/fuel mixture. U.S. Pat. No. 4,667,637 describes a system for reducing engine knock by adjusting spark timing and/or enriching the fuel mixture. U.S. Pat. No. 4,777,913 describes an auxiliary fuel system operable to increase the fuel supply and reduce detonation. A detonation or knock detection circuit is disclosed in U.S. Pat. No. 4,761,992.

The use of microprocessor-based control of two-cycle engine functions, such as spark ignition and fuel injection, has made it desirable to utilize prior art analog strategies to enhance engine performance. The control of detonation is one aspect of engine performance that is amenable to microprocessor control strategy. The prior art analog detonation control systems typically provide increases in fuel enrichment and/or spark timing retard which are directly proportional to the magnitude of the engine knock. It has been found, however, that it is often desirable to provide non-linear incremental increases in the control parameters and/or to be able to vary the value of those increases, depending upon variations in certain operating conditions or on the type of engine in which the control is implemented.

SUMMARY OF THE INVENTION

In accordance with the present invention, a detonation control system for a fuel injected, spark ignition two-cycle engine includes sensor means for sensing the engine knock or detonation level and for providing a linear series of engine knock signals which are directly proportional to the magnitude of the knock sensed. The system also includes detonation control means responsive to the knock signals from the sensor means to provide a non-linear series of stepped increases in the width of the fuel injection pulse to the engine, which series of stepped increases corresponds to the series of engine knock signals.

The detonation control means also preferably responds to the engine knock signals to provide a nonlinear series of stepped increases in spark ignition retard to the engine. Programmed microprocessor control may be utilized to interpolate between consecutive knock signals and provide linear increases in the fuel pulse width and/or the amount of spark ignition retard between each of the respective stepped increases. By utilizing a programmable microprocessor control, each of the stepped increases in the fuel pulse width and in the amount of spark retard may be selectively varied, as desired.

BRIEF DESCRIPTION OF THE DRAWINGS

FIG. 2 is a logic diagram showing operation of the system of the present invention.

DETAILED DESCRIPTION OF THE PREFERRED EMBODIMENT

Figures 1, 3:
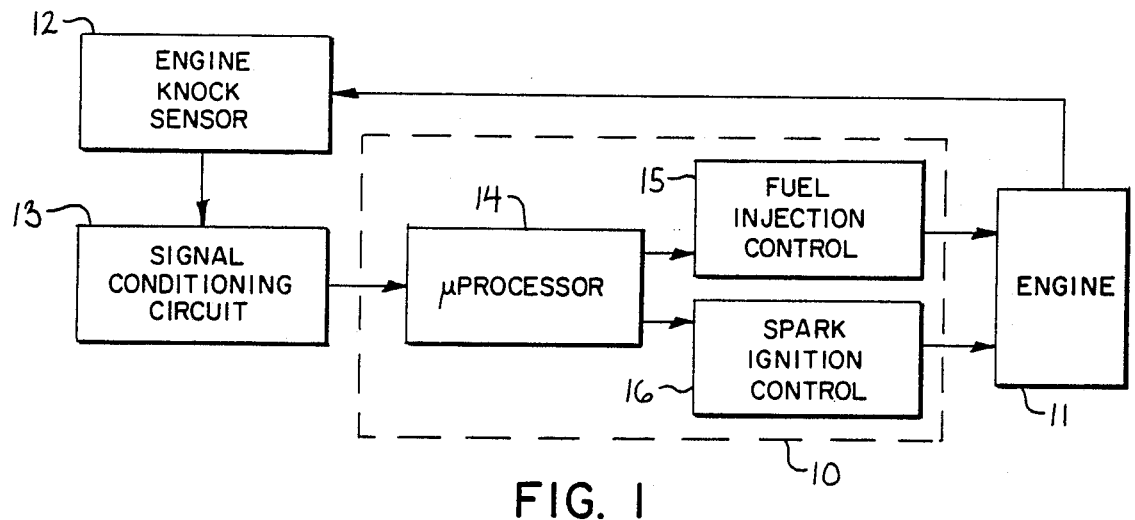
FIG. 1 is a schematic representation of an electronic engine control unit for a two-cycle engine including the detonation control system of the present invention.
FIG. 3 is a table of values representing one control program strategy for the system operation shown in FIG. 2.

Referring to FIG. 1 of the drawing, there is shown a generalized schematic of an electronic engine control unit 10 in operative attachment to a fuel injected, spark ignition two-cycle engine 11. During engine operation, the level of engine knock is continually sensed by a detonation or knock sensor 12 comprising, for example, an audio or piezoelectric transducer which converts the sensed detonation into an output electrical signal proportional thereto. A sensed engine knock is converted to an appropriate analog signal with signal conditioning circuitry 13 which may, for example, include means for signal voltage averaging, amplifying and filtering to provide a usable digital knock signal. The knock signals are supplied to a microprocessor 14 forming part of the engine control unit 10. The engine control unit also includes electronic fuel injection and spark ignition controls 15 and 16, respectively, which are operative to control those functions for the engine 11 in a manner generally known in the art. Both the fuel injection control and the spark ignition control depend upon signals representative of other engine operating parameters, such as engine speed, throttle position, manifold pressure and engine temperature. These signals are also supplied to and utilized by the microprocessor, but the various sensors from which these other signals are generated are not shown.

The signal conditioning circuit 13 inputs an amplified DC level signal to the microprocessor 14 which is directly proportional to the magnitude of the sensed engine knock. The microprocessor 14 is programmed to respond to a linear series of engine knock signals to vary the fuel injection pulse width and/or the spark ignition timing in proportion to the magnitude of the engine knock, but in a non-linear manner. Thus, the detonation control means 10 is responsive to a linear series of engine knock signals to provide a non-linear series of stepped increases in the fuel injection pulse width corresponding to the series of knock signals. Similarly, the system may provide a non-linear series of stepped changes in the spark ignition timing (in a retard direction) also corresponding to the series of knock signals.

Referring also to FIGS. 2 and 3, the detonation control system 17 of the present invention is continuously operative at engine speeds above a selected low speed level because detonation is typically only a problem at higher speeds. The output voltage signals to the microprocessor 14, representative of the magnitude of engine knock, may range for example between 0 and 4 volts. As shown in the table of FIG. 3, the voltage range is divided into a linear series of voltage levels between a threshold level of 1.0 volt and a high voltage level of 4.0 volts. For each voltage level, there is assigned a percent change in fuel injection pulse width and a degree change in spark ignition timing (in each case in a negative or retard direction). However, in contrast to the linear series of engine knock voltage signals, the stepped increases in both fuel pulse width percent change and degrees timing change are non-linear.

The detonation control system 17 is entered at start 18 as soon as engine speed exceeds the minimum operative value, as previously indicated. At the initial threshold decision step 19 it is determined if the threshold knock voltage has been attained. This voltage may, for example, be 1.0 volt in the four volt range indicated in the table. If the threshold knock voltage has not been reached, the system is operative at the first process step 20 to apply the actual knock voltage to interpolate between the fuel pulse width percent change at the threshold voltage and 0.0. The interpolated value of fuel pulse width percent change comprises a fuel knock factor (FNF) which is added to the base fuel pulse width provided by the engine control unit 10 and stored therein at process step 21. It should be noted, however, that in the values utilized in Table 3, no fuel pulse width change is provided at the threshold knock voltage level and, therefore, there is no fuel knock factor to be added to the base fuel pulse width in this particular example. Similarly, a sensed knock voltage below the threshold level is utilized at first process step 20 to interpolate between the threshold degrees timing change and 0° to provide a spark knock factor (SNF) which is added to the base timing and stored at process step 21 for use by the engine control unit 10. As with the threshold fuel pulse width change, this particular example includes no timing change at the threshold level and, therefore, the base fuel pulse width remains unchanged.

If the threshold knock voltage level is reached or exceeded at threshold decision step 19, a comparison is made at low voltage decision step 22 to determine if the engine knock has reached a low knock level (of 2.0 volts in the example shown). If it has not, the actual knock voltage level between the threshold and low voltage levels is utilized at second process step 23 to interpolate between the low fuel pulse width percent change and the threshold fuel pulse width percent change to provide a fuel knock factor (FNF) for storage at process step 21 and use by the engine control unit 10. In the example of FIG. 3, the fuel knock factor resulting from the interpolation at second process step 23 will be somewhere between 0.0 and 6.6 percent. The actual level of knock voltage may also be utilized at second process step 23 to interpolate between the low degrees timing change and the threshold degrees timing change to provide a spark knock factor which is added to the base timing and stored at process step 21 for use by the engine control unit 10. With reference to the table in FIG. 3, the minus timing change, indicating a retarding of the spark, will be between 0 and $-3°$.

If the knock voltage equals or exceeds the low voltage level at low voltage decision step 22, the system proceeds to mid-voltage decision step 24 to determine if the mid-range knock level has been reached. If the actual knock voltage is below the mid-range value (3.0 volts in the example shown in the table of FIG. 3), the actual voltage is utilized at third process step 25 to interpolate between the mid-fuel pulse width percent change and the low fuel pulse width percent change to provide a fuel knock factor for storage and use at process step 21. Similarly, if a concurrent change in spark timing is also utilized, an interpolation is made at third process step 25 between the middegrees timing change and the low degrees timing change to provide a spark knock factor for adjustment of the base timing and storage in the engine control unit at process step 21.

If the engine knock level exceeds the mid-point, producing an engine knock voltage equal to or greater than the midvoltage at decision step 24, the system proceeds to high knock voltage decision step 26. If a high knock voltage level is not reached, the actual knock voltage between the high and mid levels is utilized at the fourth process step 27 to interpolate between the high fuel pulse width percent change and the mid fuel pulse width percent change values to provide a fuel knock factor in the manner previously described for storage at process step 21. Similarly, a mid to high spark knock factor may be calculated at fourth process step 27 by utilizing the actual knock voltage to interpolate between the high DTC and midDTC values also as previously described.

Should the knock voltage reach or exceed the high voltage level at knock voltage decision step 26, the maximum or highest values of fuel pulse width percent change and degrees timing change are stored at process step 28 and provide respectively the maximum fuel knock factor (FNF) and spark knock factor (SNF) for adjustment of the base fuel pulse width and base timing.

As will be understood from the foregoing description and by reference to the table of FIG. 3, the stepped increases in the fuel pulse width percent change and in the degrees timing change are non-linear, but correspond to and are implemented in accordance with linear changes in the engine knock voltage (and the actual magnitude of engine knock). The non-linear stepped increases, which in the indicated arrangement result in generally decreasing differentials, have been found to provide a more precise control of detonation with a minimum adverse affect on engine performance and efficiency. For convenience, however the interpolations between the non-linear stepped increases are linear.

The use of a programmable microprocessor to control operation of the engine control unit 10, including the detonation control system 17 of the present invention, allows the parameters to be readily changed to adapt the detonation control system to other engine types or sizes or even to change them to suit changed operating conditions in a particular engine. Thus, any of the fuel pulse width change or timing change values in the table of FIG. 3 may be changed as desired or necessary.

Various modes of carrying out the present invention are contemplated as being within the scope of the following claims particularly pointing out and distinctly claiming the subject matter which is regarded as the invention.

I claim:

1. A detonation control system for a fuel injected, spark ignition two-cycle engine comprising:
    sensor means for sensing engine knock and for providing a linear series of engine knock signals which are directly proportional to the magnitude of the knock sensed; and,
    detonation control means responsive to said knock signals for providing a non-linear series of stepped increases in the fuel injection pulse width to the engine corresponding to said series of knock signals.

2. The system as set forth in claim 1 wherein said detonation control means is further responsive to said knock signals to provide a nonlinear series of stepped increases in spark ignition retard to the engine.

3. The system as set forth in claim 2 wherein said detonation control means includes means for interpolating between consecutive knock signals in said linear series to provide linear increases in the fuel pulse width and the amount of spark retard between each of their respective stepped increases.

4. The system as set forth in claim 3 wherein said detonation control means includes a programmed microprocessor control.

5. The system as set forth in claim 4 including means for programming said microprocessor to selectively vary the value of each of said stepped increases in fuel pulse width and amount of spark retard.

6. The system as set forth in claim 3 wherein said non-linear stepped increases comprise generally decreasing differentials.

* * * * *